Patented Apr. 26, 1938

2,115,173

UNITED STATES PATENT OFFICE 2,115,173

NITRIC OXIDE OXIDATION

William C. Klingelhoefer, Syracuse, N. Y., assignor to The Solvay Process Company, New York, N. Y., a corporation of New York No Drawing. Application November 25, 1936, Serial No. 112,825

5 Claims. (Cl. 23—162)

The present invention relates to catalytic processes for the oxidation of nitric oxide to higher oxides of nitrogen.

Prior to my invention the catalytic oxidation of nitric oxide by gaseous oxygen has been proposed. Due to the numerous limitations and drawbacks upon the proposed processes, the non-catalytic process, in which a nitric oxide-air mixture is maintained in a space of adequate volume, remains the commercial process. A substantial disadvantage of this non-catalytic process is that large reaction chambers must be provided in which the nitric oxide gas may be held for a considerable period of time to permit the reaction to progress to the desired degree of oxidation of the nitric oxide content of the gas. The rate of oxidation of NO becomes slow as the concentration of NO in a gas is decreased by progressive oxidation of the NO originally present. Another factor inimical to the non-catalytic oxidation process is that the reaction is exothermic, the gases undergoing reaction become heated and the rate of oxidation decreases with rising temperatures. Because of these factors, even with large reaction chambers the degree of oxidation of the nitric oxide in commercial practice, is limited, particularly when a dilute nitric oxide gas is treated.

Attempts have been made to catalytically oxidize nitric oxide at relatively low temperatures; e. g., at temperatures below 100° C. These low temperatures have been employed to take advantage of the favorable equilibrium conditions for the oxidation reaction at low temperatures and, at least in some cases, because it was found the activity of the catalysts used decreased with increasing temperatures. Further, it has heretofore been considered necessary to thoroughly dry nitric oxide gases before contacting them with a catalyst in order to prevent a decrease or even a complete loss in activity of the catalyst. Such a drying of commercial nitric oxide gases which contain substantial quantities of moisture is expensive.

It is an object of this invention to provide processes for the oxidation of nitric oxide containing gases which also contain water vapor without necessitating a drying of the gas.

Moist gases containing nitric oxide are produced in many commercial chemical processes, such as the oxidation of ammonia, the manufacture of nitric acid from nitrogen peroxide and water and the manufacture of sodium nitrate from nitrogen peroxide and sodium hydroxide. It is a further object of this invention, therefore, to provide processes for the direct oxidation of such gases while containing water vapor.

According to the process of the present invention, a gas containing nitric oxide and oxygen and which may also contain above about 0.5% water vapor, preferably about 0.5% to about 20% water vapor, is contacted with cobalt oxide at a temperature between about 160° C. and about 350° C. I have found, when contacting a gas containing nitric oxide and oxygen with a cobalt oxide catalyst, the catalyst actively promotes the reaction of the oxygen and nitric oxide even in the presence of the water vapor when operating within this temperature range. It is preferred to operate at the higher temperatures within the range at about 300° to 350° C., particularly wher the gas contains a large proportion of moisture, e. g. about 10% to about 20% or more. At the lower temperatures, a large proportion of water vapor in the gases tends to lower the activity of the catalyst, which tendency may be counteracted by operating at the higher temperatures.

The preferred cobalt oxide catalyst, into contact with which the nitric oxide containing gas is passed, is a highly-active cobalt oxide of a gel structure. Such an active catalyst may be produced by dissolving 237 grams of chlorine in a solution of 500 grams of potassium hydroxide in 1276 grams of water. The solution so formed is added to a solution of cobaltous nitrate $(Co(NO_3)_2)$ containing approximately 150 grams of cobalt in 20 liters of water. To the solution so produced there is added a dilute solution of potassium hydroxide containing 700 grams KOH. The mixture is stirred, the precipitate which forms is allowed to settle, and the liquor is decanted. The precipitate is then washed by decantation, filtered, and dried at 120° C. for 24 hours. The cake of material thus obtained is broken up and the particles screened to recover the granules of 8 to 16 mesh size. The granular catalyst thus obtained consists of a gel structured cobalt oxide.

While I have described a process for making a preferred highly active catalyst, my invention is not limited to the use of cobalt oxide catalysts prepared by such a process, but contemplates the use of cobalt oxide catalysts prepared in other manners.

In order that my invention may be more clearly understood, the following examples, typical of preferred methods, are given by way of illustration:

*Example 1.*—A mixture of nitric oxide and air containing about 10% nitric oxide (NO) and 10% water vapor is contacted with a highly-active gel structured cobalt oxide prepared in the manner described above, at a space velocity of about 1000, and at a temperature of 300° C. The space velocity given is based on the total volume of gas (at standard temperature and pressure) passed into contact with the catalyst and is equal to the volume of this gas per unit apparent volume of catalyst per hour. Analysis of the exit gases of such a process has shown a conversion of about 83% of the nitric oxide to nitrogen peroxide ($NO_2$ or $N_2O_4$).

*Example 2.*—A gas resulting from the catalysis of an ammonia-air mixture which contains about 10% nitrogen oxides, principally in the form of nitric oxide, and about 15% water vapor, is cooled to about 160° C., and is passed in contact with a cobalt oxide catalyst prepared as described above. The catalyst is maintained at a temperature in the range about 300° C. to 350° C. Substantially all the nitric oxide in the gas is converted into nitrogen peroxide.

The above examples are given by way of illustration only and not as limiting the scope of the invention defined by the claims hereunder. Although, as shown by the examples, an important feature of the invention is that it provides a method for oxidizing nitric oxide in a gas in which it is accompanied by substantial quantities of water vapor, the invention is not limited to such gases but may be employed for the treatment of dry gases.

I claim:

1. The process for the catalytic oxidation of nitric oxide which comprises passing a gas containing nitric oxide, oxygen and about 0.5% or more water vapor into contact with a cobalt oxide catalyst maintained at a temperature between about 160° C. and about 350° C.

2. The process for the catalytic oxidation of nitric oxide which comprises passing a gas containing nitric oxide, oxygen and about 0.5% to about 20% water vapor into contact with a cobalt oxide catalyst maintained at a temperature between about 160° C. and about 350° C.

3. The process for the catalytic oxidation of nitric oxide which comprises passing a gas containing nitric oxide, oxygen and about 10% to about 20% water vapor into contact with a cobalt oxide catalyst maintained at a temperature between about 300° C. and about 350° C.

4. The process for the catalytic oxidation of nitric oxide which comprises passing a gas containing nitric oxide, oxygen and about 0.5% to about 20% water vapor into contact with a gel structured cobalt oxide catalyst maintained at a temperature between about 160° C. and about 350° C.

5. The process for the catalytic oxidation of nitric oxide which comprises passing a gas containing nitric oxide and oxygen into contact with a cobalt oxide catalyst maintained at a temperature between about 160° C. and about 350° C.

WILLIAM C. KLINGELHOEFER.